(12) United States Patent
Granger-Brown et al.

(10) Patent No.: US 8,456,976 B2
(45) Date of Patent: Jun. 4, 2013

(54) METHOD AND APPARATUS FOR CENTRING A DISK ON A SPINDLE

(75) Inventors: Nicholas John Granger-Brown, Waterlooville (GB); Martin Siering, Chichester (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 13/343,447

(22) Filed: Jan. 4, 2012

(65) Prior Publication Data

US 2012/0182849 A1 Jul. 19, 2012

Related U.S. Application Data

(60) Provisional application No. 61/432,382, filed on Jan. 13, 2011.

(51) Int. Cl.
*G11B 5/58* (2006.01)
(52) U.S. Cl.
USPC ..................................... 369/53.41; 360/77.03
(58) Field of Classification Search
USPC ............ 369/47.38, 47.44, 53.1, 53.41, 53.42, 369/44.32, 54.14; 360/75, 77.02, 77.03, 71, 360/69
See application file for complete search history.

(56) References Cited

U.S. PATENT DOCUMENTS

| | | | |
|---|---|---|---|
| 5,811,678 A | 9/1998 | Hirano | |
| 6,101,876 A | 8/2000 | Brooks et al. | |
| 6,189,371 B1 | 2/2001 | Hirano | |
| 6,421,199 B1 * | 7/2002 | McKenzie et al. | 360/77.04 |
| 6,771,451 B2 * | 8/2004 | Morris et al. | 360/75 |
| 7,791,831 B2 * | 9/2010 | McGlennen et al. | 360/70 |
| 2005/0176186 A1 * | 8/2005 | Lee et al. | 438/157 |
| 2007/0086295 A1 | 4/2007 | McGlennen et al. | |
| 2009/0244764 A1 | 10/2009 | Kotake et al. | |
| 2012/0207005 A1 * | 8/2012 | Anderson et al. | 369/53.41 |

\* cited by examiner

*Primary Examiner* — Thang Tran
(74) *Attorney, Agent, or Firm* — Pillsbury Winthrop Shaw Pittman LLP

(57) ABSTRACT

There is disclosed herein a method and apparatus for centering a disk on a spindle, a spinstand and a method of testing with a spinstand. The method of centering includes attaching the disk to the spindle with a stick-slip clamp. A vector is determined by which the centre of the disk is displaced from the spindle axis and the vector is aligned with a movably mounted piezo actuator. A voltage is then applied to the piezo actuator to cause the piezo actuator to apply an impulse to the edge of the disk to cause the disk to slip in the clamp and reduce the displacement of the disk.

18 Claims, 8 Drawing Sheets

METHOD AND APPARATUS FOR CENTRING A DISK ON A SPINDLE

This application claims the benefit of priority to U.S. application Ser. No. 61/432,382, filed Jan. 13, 2011, the content of which is hereby incorporated by reference.

The present invention relates to a method of centring a disk on a spindle, to an apparatus for centring a disk on a spindle, to a method of testing with a spinstand and to a spinstand.

In embodiments, the present invention relates generally to head media test apparatus such as are commonly known as "spinstands" or "dynamic electrical test machines" in the art. Spinstands were first developed in the art as a tool for use during research and development to allow the performance of the various components of disk drives, for example the heads, disks and channels, to be evaluated and optimised. It is now common to also use spinstands in the field of disk drive manufacturing to test each manufactured read/write head or disk before it is assembled into a disk drive unit.

A typical spinstand comprises a motor-driven spindle on which a disk to be tested can be mounted and spun, and a head load mechanism for holding and positioning the read/write head to be tested. Test data is written to a track of the disk with the head. The test data is subsequently read back with the head, measured and analysed, and the results displayed to the user. Various parameters under which the data is written and/or read back can be controlled and varied, allowing the performance and characteristics of the part under test to be investigated under various conditions. In this way a series of tests may be conducted, including for example bit error rate (BER) bathtubs, track squeeze, track centre, read/write offset, overwrite, etc.

In order to perform accurate testing with the spinstand, it is important to accurately align the disk on the spindle. For example, the disk may be circular servo tracks written to it. It is desirable that the centre defined by the servo tracks coincides as closely as possible with the spindle axis so that servo controller does not have to compensate for eccentricity of the servo track when following a servo track. Various schemes of centring the disk have been proposed in the prior art.

US-A-2007/0086295 (in the name of Seagate Technology LLC) entitled "Data Storage Disk Track Centering" describes a method and system for positioning a disk in a spinstand. The method involves first measuring the offset vector of the centre of the disk from the axis of rotation by observing the servo patterns of the disk with the head as the disk rotates. The disk is then rotated until the offset vector is aligned with a "pusher" element. The edge of the disk is then found by advancing the pusher element towards the disk with a high accuracy positioning stage until it is sensed that the pusher element has come into contact with the edge of the disk. The pusher element is withdrawn and the disk is then unclamped by the spindle. The pusher element is then moved by the positioning stage a new position, calculated such that it contacts and moves the disk to reduce the offset vector towards zero.

This method can present difficulties in practice either because of the confined space makes it difficult to provide the necessary apparatus, and because it is difficult to sense the edge of the disk with sufficient accuracy. This method also requires that the disk be released from the chuck while it is repositioned and then re-clamped which may introduce additional error.

Other techniques are known for affecting the dynamic balance of a disk stack in a disk drive for example in U.S. Pat. Nos. 6,189,371 & 5,811,678 (IBM), U.S. Pat. No. 6,101,876 (Western Digital), and US-A-2009/0244764 (Fujitsu). In these documents, an external impact is imparted to the edge of the disk drive once every revolution as the disks are spinning in order to balance the disk stack. These techniques have limited accuracy due to the limited feedback available of how centralised is the disk stack. These techniques are also not directly applicable to the spinstand situation, where the spindle assembly is normally mounted to a very high mass deck.

According to a first aspect of the present invention, there is provided a method of centring a disk on a spindle, the method comprising:

a) attaching the disk to the spindle with a stick-slip clamp;

b) determining a vector by which the centre of the disk is displaced from the spindle axis;

c) aligning the vector with a movably mounted piezo actuator; and, d) applying a voltage to the piezo actuator to cause the piezo actuator to apply an impulse to the edge of the disk to cause the disk to slip in the clamp and reduce said displacement of the disk.

The method allows precise movements of the disk to correct for track eccentricity without requiring precision motion to find the edge of the disk or the need to release the disk. Using a movably mounted piezo actuator, i.e. a piezo actuator mechanism that can "float" relative to the disk, the actuator can be brought into touching contact, or in an embodiment into compliant contact, with the edge of the disk. The piezo actuator can then be actuated by the application of a voltage pulse from its controller to accelerate the piezo and cause a corresponding force to be generated. This force is backed at one end by the inertial mass of the end of the piezo and its mounting, and at the other end by the edge of the disk. The force applied to the edge of the disk is sufficient to break the static friction bond between the disk and the stick-slip clamp. The disk slips and stops in a displaced position so as to decrease or eliminate the eccentricity of the disk. The displacement of the disk can be tuned by adjusting the level and number of the voltage pulses applied to the piezo actuator. Thus, the method can be easily adapted to different set-ups of the apparatus, e.g. different types of disk, actuators, etc.

It has been found by this method that it is not essential to locate the precise edge of the disk or to precisely align the actuator with the disk. This is in contrast with the prior art, e.g. US-A-2007/0086295, where it is necessary to locate the edge of the disk with high precision before moving the disk. US-A-2007/0086295 thus calls for a high precision actuator capable of achieving an absolute position on the deck of the spinstand with extremely high precision in order for this method to work. Another advantage of the present invention is that it is not necessary to unclamp or adjust the clamping force with which the disk is held in order to move the disk due to the fact that a stick-slip clamp is used. In contrast, US-A-2007/0086295 uses a disk clamping mechanism that clamps the disk whilst the edge of the disk is found, unclamps the disk whilst the disk is moved, and then reapplies the clamp for further adjustment or for testing. As well as requiring a more complicated clamp and more complicated control, this unclamping and re-clamping of the disk has the capacity for introducing errors into the position of the disk, potentially limiting the ability of this method to centre the disk on the spindle.

It is has been found that a preferred frictional force between the disk and the spindle to hold the disk is between 5 and 20 N for preferred piezo actuator setup. However, as will be appreciated, the actual frictional force used will in practice depend on other factors, such as the mass of the disk and actuator, and the acceleration achieved by the actuator.

The impulse motion of the effector in conjunction with the clamp does not have backlash In a preferred embodiment, the piezo actuator comprises a body portion with an associated mass and an end portion adjacent the disk for applying said impulse to the edge of the disk, the end portion being movable relative to the body portion upon application of a voltage to the piezo actuator, where said associated mass is substantially greater than the mass of the disk.

It is preferred that the mass backing the piezo actuator is at least one order of magnitude greater than the disk being tested. So, for a typical disk, which would have a mass of about between 5 to 10 g, the mass backing the piezo is preferably at least 50 to 100 g. It is likely that the mass of the body of the piezo actuator will be under this preferred range. In this case, the mass may be made up by the element by which the piezo actuator mounted or by a additional mass, for example a block of aluminium, attached to the piezo actuator so that it moves with the piezo actuator. It is assumed here that the mass of the piezo actuator in front of the piezo crystal is small enough compared with the mass behind the piezo crystal to be negligible.

Preferably the voltage is applied in a series of pulses. It has been found that there is a resonant effect by applying a series of pulses which means the disk can be displaced by a greater amount for a given voltage applied to the piezo actuator. This allows a lower voltage to be used, which is useful due to safety considerations. It has been found that two, or more preferably three, pulses are optimum in achieving the resonant effect. It has been found for a typical setup of actuator and disk using a voltage of 24V applied to the actuator that a time period of between about 70 and 85 us between pulses gives good results.

In an embodiment, the piezo actuator is brought into resting contact with the disk before an impulse is applied to the disk. In another embodiment, the piezo actuator is brought into compliant contact with the disk before an impulse is applied to the disk. The first arrangement generally requires an actuator for advancing the whole piezo actuator assembly towards the disk with sufficient control to achieve the resting contact. The second arrangement is simpler in that it does not require a high degree of control in moving the actuator assembly to make contact with the disk, as the contact is compliant making high positional accuracy less important.

Preferably, the method comprises in step d, calculating the voltage to apply to the piezo actuator in accordance with the size of said vector and with a predetermined estimate of the displacement per voltage. The estimate can be calculated for example by performing the experiments and analysis described in the present description. Generally the estimate will take into account the masses of the various elements, the clamping force and frictional force with which the disk is held on the spindle, the movement profile of the piezo actuator, etc.

Preferably, the method comprises:

e) after step d, determining a new vector by which the centre of the disk is displaced from the spindle axis;

f) calculating the displacement of the disk caused by the previous impulse;

g) updating said estimate of the displacement per voltage; and, h) repeating steps c and d with the new vector and the updated estimate.

This allows the method to self calibrate itself. The estimate is revised to take into account the displacement achieved by a previous activation of the piezo actuator. For example, if it is found that the previous actuator has moved the disk only 75% (i.e. by ¾) of the expected distance, i.e. the distance necessary to reduce the error vector to zero, then the estimate can be scaled up by a third (i.e. by 4/3). This makes the subsequent movement by the piezo actuator more accurate and therefore reduces the number of iterations required to centre the disk. In effect, this provides an algorithm that automatically learns so as to reduce the error and therefore the number of iterations.

Preferably, the vector is calculated by reading a servo track written to the disk and determining the repeatable run out of the servo track. This is practicable when the method is used in the context of a spinstand, where a read/write head is used to read and write data to and from the disk. Typically, the spinstand controller will generate a Position Error Signal from the servo track on the disk. The PES will vary with rotational position of the disk due to Repeatable Run Out of the disk due to its eccentricity. By finding the maximum deviation in the PES from the average and the rotational position of the disk at which it occurs, an error vector can be found, i.e. a measure of distance by which the disk is off-centre and the direction of its eccentricity, i.e. rotational position of the disk in which the maximum deviation occurs. The rotational position of the disk can be measured by reading the servo track information, i.e. sector numbers encoded with gray codes in the servo track. Nonetheless, the invention does not need servo tracks to work. For example, the eccentricity of the disk can be measured with one or more laser displacement devices, and/or the rotational position of the disk can be found by an optical encoder on the spindle.

In a second aspect of the present invention, there is provided a method of testing with a spinstand, comprising:

centring a disk on a spindle in accordance with the method described above;

spinning up the disk; and, reading test data to and from the disk with a read/write head.

This allows an improved method of centring a disk on a spinstand compared with the prior art. High precision is needed when testing with a spinstand due to the high accuracy with which the head must be positioned relative to a track. For example, current spinstands can preferably position the head to within tens of nanometers of a desired position on a track which may be only 100 nanometers wide. By centring the disk with high accuracy, the accuracy of the testing can be improved.

According to a third aspect of the present invention, there is provided apparatus for centring a disk on a spindle, the apparatus comprising:

a controller;

a spindle having a stick-slip clamp for holding a disk and rotating the disk;

a sensor for sensing the position of the disk; and, a movably mounted piezo actuator, wherein the controller is arranged to:

a) determine a vector by which the centre of the disk is displaced from the spindle axis from the position data from the sensor;

b) move the disk relative to the piezo actuator so that the vector is aligned with the piezo actuator; and c) apply a voltage to the piezo actuator to cause the piezo actuator to apply an impulse to the edge of the disk to cause the disk to slip in the clamp and reduce said displacement of the disk.

According to a fourth aspect of the present invention, there is provided a spinstand comprising:

a spindle; and, apparatus for centring a disk on the spindle as described above.

Embodiments of the present invention will now be described by way of example with reference to the accompanying drawings, in which.

Figure 1:
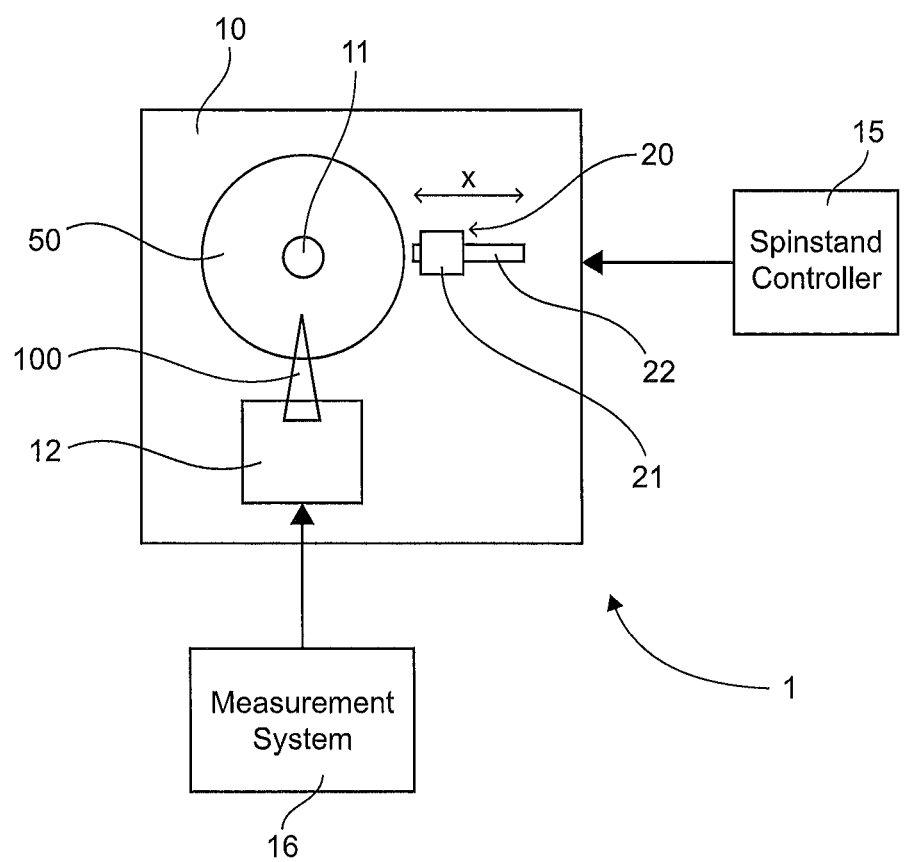
FIG. 1 shows schematically a spinstand having an example of an apparatus for centring a disk in accordance with an embodiment of the present invention.

FIG. 1 shows a schematic diagram of a spinstand 1. The spinstand 1 mechanically can be of any suitable known type. A preferred spinstand 1 comprises a high mass deck 10 which provides a vibration isolated platform for the other mechanical components of the spinstand 1. Attached to the deck 10 are a spindle assembly 11 on which a disk 50 to be tested can be mounted and spun, and a head load mechanism 12 for holding and positioning the read/write head 100 to be tested.

The spinstand 1 also has a spinstand controller 15 which is responsible for controlling the mechanical aspects of spinstand 1, such as spinning up the spindle assembly 11 and disk 50, loading the head 100 to the disk 50 and fine positioning the head 100 to a desired location on the disk 50. The disk 50 has servo tracks written to it, which may comprise gray codes encoding the track and/or sector number as well as servo bursts. These can be read by the head 100 and used by the spinstand controller 15 to determine the location of the head 100 over the disk 50. Thus, the spinstand controller 15 can move the head 100 in accordance with the servo information read by the head 100 to a desired location on the disk 50. The controller 15 can be implemented by a suitably programmed computer and/or one or more electronic circuit boards comprising suitable control logic.

The spinstand 1 also has a measurement system 16 (also sometimes known as a read/write analyser) which is arranged to write test data with the head 100 to a track on the disk 50, and subsequently to read back the test data with the head 100, measure and analyse the data, and present the results to the user. Various parameters under which the data is written and/or read back can be controlled and varied by the measurement system 16, allowing the performance and characteristics of the part under test to be investigated under various conditions. In this way a series of tests may be conducted, including for example bit error rate (BER) bathtubs, track squeeze, track centre, read/write offset, overwrite, etc. The measurement system 16 can be implemented by a suitably programmed computer and/or one or more electronic circuit boards comprising suitable control logic.

Various ways of implementing a spinstand 1 as described so far are known in the prior art, so these aspects of a spinstand 1 will not be described in detail here.

Figure 2:
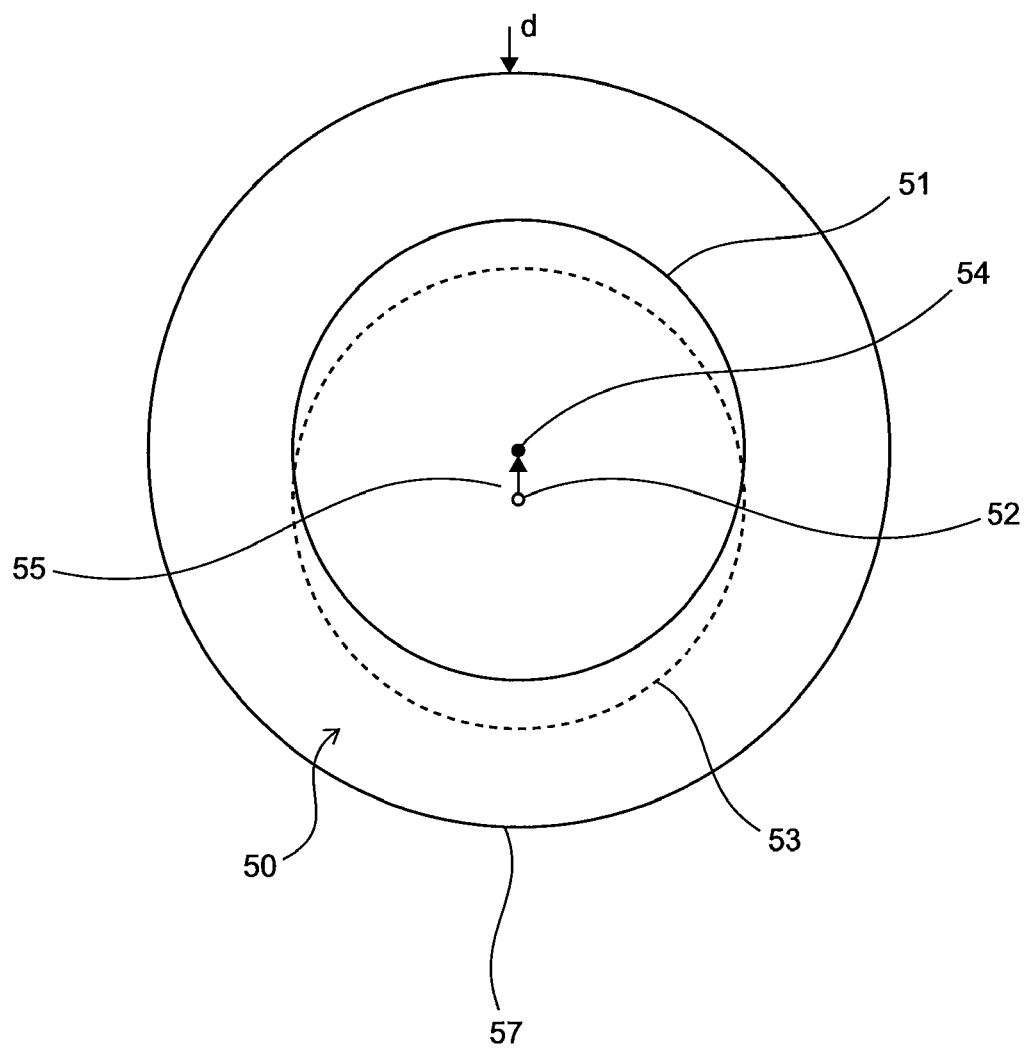
FIG. 2 shows a track on the disk mounted to the spindle of the spinstand of FIG. 1.

FIG. 2 shows an example of a servo track 51 on the disk 50. Servo tracks 51 can be implemented in various different ways as known in the art per se. Typically the servo track 51 will have servo bursts having null points which define the centre of the track 51. As the head 100 flies over the servo track 51, it detects the servo bursts and generates a Position Error Signal which represents how far the head 100 is radially offset from the track centreline. This is used in radially positioning the head 100 relative to the track 51.

Typically the servo track 51 is written to the disk 50 before it is mounted to the spindle assembly 11, for example in a separate servo-writer apparatus or by etching, as are known in the art per se. However, this gives rise to the problem that the disk 50 when mounted to the spindle assembly 11 may not be perfectly aligned so that the centre 54 of the servo track 51 does not coincide exactly with the rotational axis 52 of the spindle assembly 11. As can be seen from FIG. 2, the centre 54 of the disk 50 as defined by the centre of the servo track 51 is offset from the rotational axis 52 of the spindle assembly 11 by an error vector 55, which gives a measure of the eccentricity of the disk 50. This means that as the disk 50 rotates, from the point of view of the head 100 positioned at a fixed radial position over the track 51, the radial position of the track 51 varies. This phenomenon known as Repeatable Run Out (RRO). The servo track 53 shown in broken line in FIG. 2 shows the desired position of the servo track centred on the rotational axis 52 of the spindle assembly 11. RRO means that the servo controller 15 has to continually adjust the position of the head 100 to compensate for the RRO to keep the track at the desired radial position relative to the track 51. Accordingly it is generally desirable to position the disk 50 as centrally as possible on the spindle assembly 11 to eliminate RRO or reduce it to an acceptable level.

To address this problem, as shown in FIG. 1 in accordance with an embodiment of the present invention, a disk centring mechanism 20 is provided on the deck 10 of the spinstand 1 for centring the disk 50 or the tracks written to the disk 50 on the spindle assembly 11. "Centring" used herein means reducing or eliminating the offset of the disk 50 (or tracks) relative to the spindle axis. The disk centring mechanism 20 comprises a piezo actuator assembly 21 which is preferably mounted on a linear actuator 22. The linear actuator 22 can be for example provided by a linear stage, a pneumatic slide or a ball screw mechanism. The linear actuator 22 is operable to move the piezo actuator assembly 21 in a direction 'x' between an operable position adjacent the disk 50 where it is positioned for centring the disk 50, and a retracted position away from the disk 50 where it is positioned when not in use and when testing is being performed on the spinstand 1. The various aspects of the disk centring mechanism 20 can be controlled by the spinstand controller 15 or by a separate controller.

Figure 3:
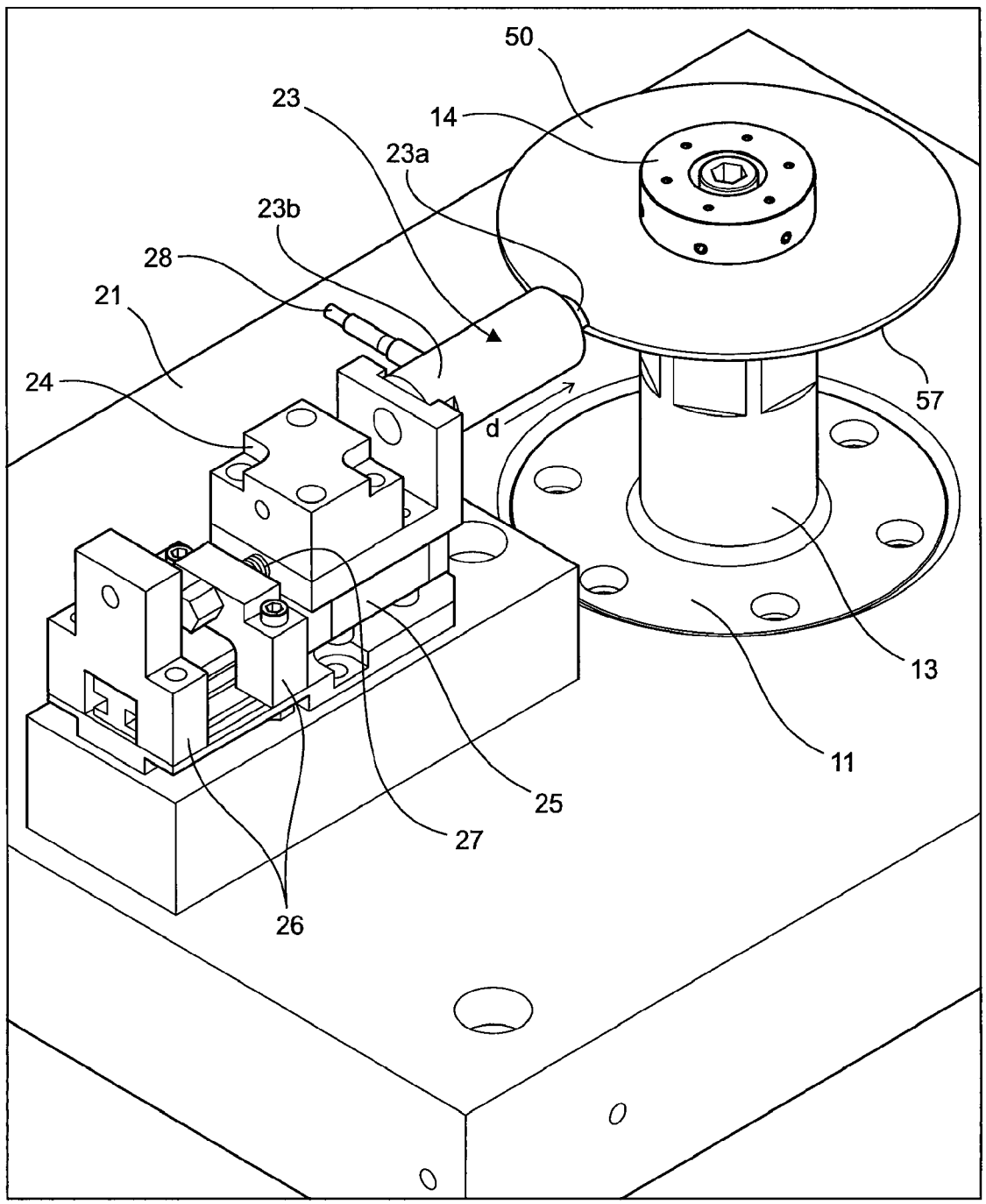
FIG. 3 shows a detail view of the piezo actuator assembly of FIG. 1.

FIG. 3 shows a detail view of the piezo actuator assembly 21 in the operable position in relation to a disk 50 mounted to the spindle assembly 11. A piezo actuator 23 has a contact end 23a adjacent the edge 57 of the disk 50. The body of the actuator 23b is rigidly mounted to a mass 24. The mass 24 and piezo actuator 23 are mounted to a rail 25, which is constrained by guide members 26 so as to be slidably movable a short distance in a direction 'd' in the plane of the disk 50 and towards the disk spindle axis 52. The guide members 26 are mounted to the movable part of the linear actuator 22 where used, or to the deck 10 where a linear actuator 22 is not used. A spring or other biasing element 27 is preferably disposed between the mass 24 and one of the mounts 26 to bias the mass 24 and piezo actuator 23 mounted on the slidable rail 25 towards the disk 50 so that the end 23a of the piezo actuator 23 rests against the edge 57 of the disk 50 with a small contact force F. Preferably F is up to 10 N. However, F should be less than the friction force, i.e. the force between the spindle adapter and the disk 50 which in practice is dependent on the clamping force and friction coefficient (as mentioned in more detail in item (1) below). In the present example, F is 5 N. The parts mounted on the rail 25 are otherwise free to slide on the axis of motion.

The piezo actuator 23 has the characteristic of expanding when a voltage is applied to it via its input 28. The piezo actuator 23 is aligned so when a voltage is applied, the contact end 23a expands relative to the body 23b in direction 'd' in the plane of the disk 50 and towards the spindle axis 52.

The spindle assembly 11 comprises a motor-driven spindle 13, such as an air bearing spindle, and a spindle adaptor 14 attached to the end of the motor-driven spindle 13 for holding the disk. The spindle adaptor 14 is constructed and arranged to hold a disk 50 in such a way as the disk 50 can undergo movement by 'stick-slip' when accelerated. For example, the spindle adaptor can comprise a body portion and a cap portion between which the disk 50 can be held with a predetermined clamp force which allows stick-slip of the disk 50 when given a predetermined acceleration.

Stick-slip is caused by the surfaces alternating between sticking to each other and sliding over each other, with a corresponding change in the force of friction. Typically, the static friction coefficient between two surfaces is larger than the kinetic friction coefficient. If an applied force is large enough to overcome the static friction, then the reduction of the friction to the kinetic friction can cause a sudden jump in the velocity of the movement.

The piezo actuator 23 is excited by a voltage source from its controller with a very steep rise time which causes the piezo actuator 23 to expand rapidly with an acceleration which can exceed 1000 ms-2. The rapid acceleration is opposed on one side by the disk 5 and on the other by the mass 24. The disk 50 is initially fixed due to the friction between it and the spindle adaptor 14, which can be considered to be immovable for present purposes. The mass 24 is free to move due to its slidable mounting on its rail 25.

According to the well known laws of physics, this change in motion requires a force proportional to the acceleration of the moving mass. Note, the moving mass is the combined mass of the mass 24, the rail 25, the moving parts of the piezo actuator 23 and any other parts that move with the mass 24. It is expected that the mass of mass 24 will be the major component of the combined mass. Thus, in the following, references to the mass of mass 24 include the mass of any components that move with the mass 24. Also according to the well known laws of physics, a force equal and opposite the force generated by the acceleration of the moving mass must be applied to the disk 50. This force on the disk 50 is transmitted in turn to the interface between the disk 50 and the spindle adaptor 14. If the acceleration of the piezo actuator 23 is large enough then the force will not only move the mass 24 but will also overcome the static friction force of the connection between the disk 50 and the spindle adaptor 14, at which point the disk 50 will start to slip relative to the spindle adaptor 14.

Eventually, the acceleration of the piezo actuator 23 decreases to a point where the force generated is lower than the dynamic friction force between the disk 50 and the spindle adaptor 24 and the disk 50 comes to rest at a new position, at a displacement from its previous position.

Thus, the disk 50 may be moved in a controlled fashion by applying one or more voltage pulses to the piezo actuator 23, causing impulses to be applied to the edge 57 of the disk 50, causing the disk 50 to slick-slip in the spindle adaptor 14. It will be appreciated that the relationship between the voltage pulse applied to the input 28 of the piezo actuator 23 and the resultant displacement of the disk 50 will in practice depend on many factors of the particular setup of the spinstand 1, such as the type of piezo actuator 23 used, the clamping force of the spindle adaptor 14, the friction coefficient between the disk 50 and the spindle adaptor 14, and the mass of the disk 50, of the piezo actuator 23 and its backing mass 24, etc. Experiments to determine the typical amount of disk displacement for a given impulse are described below.

The important parameters for this mechanism to create the desired translational movement of the disk 50 are:

1) The frictional force between the disk 50 and the spindle adaptor 24 needs to be low enough that the mechanism can temporarily overcome it and with enough control that the results are consistent, i.e. to avoid any kind of dynamic uncontrolled friction. The frictional force will be determined by the material properties of the disk 50 and spindle adaptor 24 which should be well known and the clamping force which must be controlled by design and operation of the equipment.
2) The inertial mass 24 of the assembly behind the piezo actuator 23 needs to be relatively substantial. In particular, it is preferred that the mass 24 has a mass that is significantly larger than the mass of the disk 50 and the elements of the actuator 23 between the piezo crystal and the disk 50. The inertial mass 24 will be known and controlled by design.
3) The acceleration of the piezo actuator 23 needs to be large enough that the force generated (according to F=m·a) can overcome the static friction force with which the spindle adaptor 14 clamps the disk 50.
4) The duration of the acceleration determines how far the disk 50 will be moved during the pulse. The acceleration and duration of motion can be finely controlled through the profile of the voltage applied to the piezo actuator 23 by the driving controller. The system can be calibrated during use if the properties of the disk 50 or spindle adaptor 14 change.

A preferred method of centring the disk is as follows:

1. The eccentricity of the disk 50 is initially measured. Typically this will be done by reading the eccentricity of servo track 51 with the head under test 100 which was previously written or etched onto the disk 50. The maximum value of the PES signal derived from the servo track 51 will give rise to the error vector 55.
2. The disk 50 is stopped at a rotational position where the error vector (arrow 55 shown in FIG. 2) is aligned towards the piezo mechanism in line with its activation direction (arrow d shown in FIGS. 1 and 2). The piezo actuator assembly 21 is brought into contact with the edge 57 of the disk 50 using the linear actuator 22. As described above, this contact may be resting contact. Alternatively where a biasing element 27 is used, the contact can be compliant contact which reduces the precision with which moving the piezo actuator assembly 21 needs to be controlled.
3. One or more voltage pulses are applied to the piezo actuator 23 which cause impulsive forces to be applied to the edge 57 of the disk 50 and hence to the interface of the disk 50 and spindle adaptor 14. The peak force is sufficient to break the frictional forces between the disk 50 and spindle adaptor 14 and the disk 50 will be displaced by a small amount. Typically this displacement will be of the order of 100 nm and is controlled by the design and operating parameters of the device (which are described below). The exact amount of displacement caused by each pulse can vary and in this step a starting estimate is used.
4. The piezo actuator assembly 21 is moved away from the disk 50 by the linear actuator 22 and the disk 50 is spun up by the spindle assembly 11.

5. The eccentricity of the disk 50 is again measured by the same method as before to generate a new error vector. If this is found to be within an acceptable tolerance the process stops at this point.
6. If a further correction is required then the next step is to estimate how far one step of the piezo actuator 23 has displaced the disk 50 in step 3. This is done by comparing the previous error vector 55 with the new error vector 55. This calculation is used to update the initial estimate of how much the disk 50 moves for an impulse.
7. The disk 50 is stopped and step 3 is repeated using the new estimate for generating the voltage pulse or pulses.
8. Steps 4 to 7 are repeated until the disk 50 is correctly positioned within a certain tolerance or a limit of the number of tries has been reached.

Test System

Figure 4:
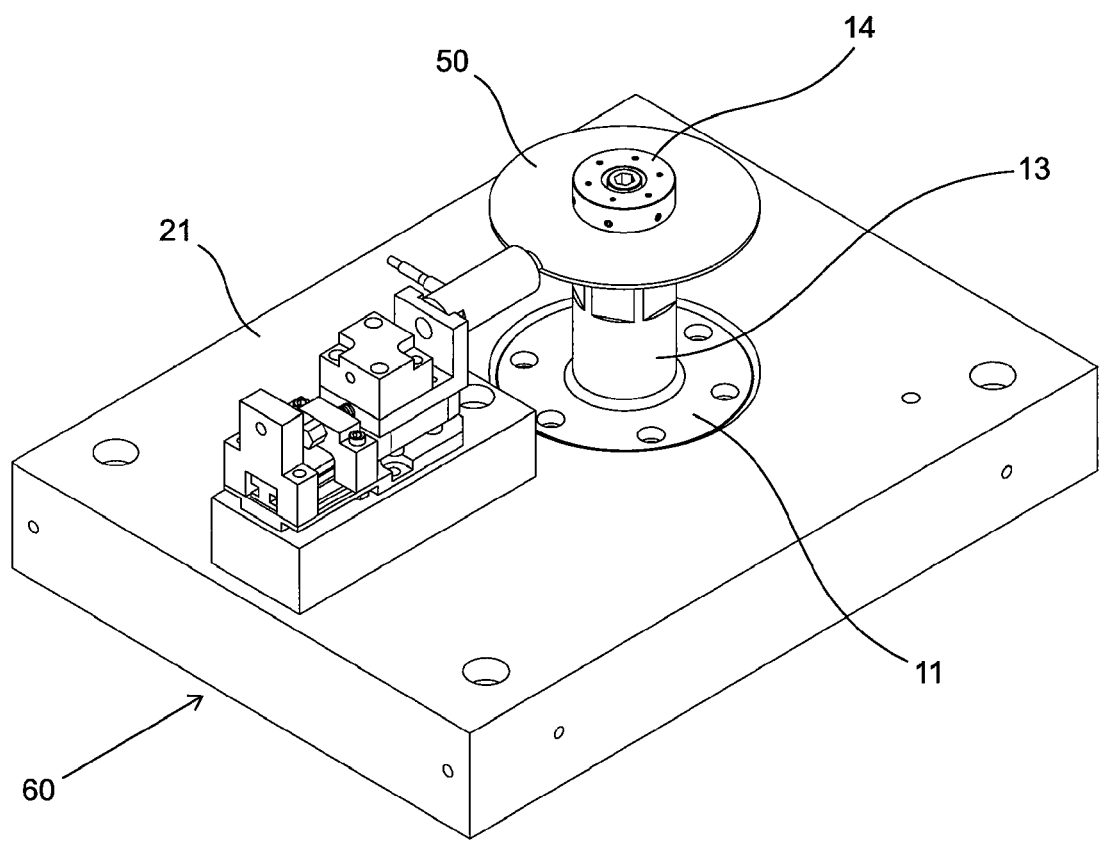
FIG. 4 shows a test system having an example of an apparatus for centring a disk in accordance with an embodiment of the present invention.
Figure 5:
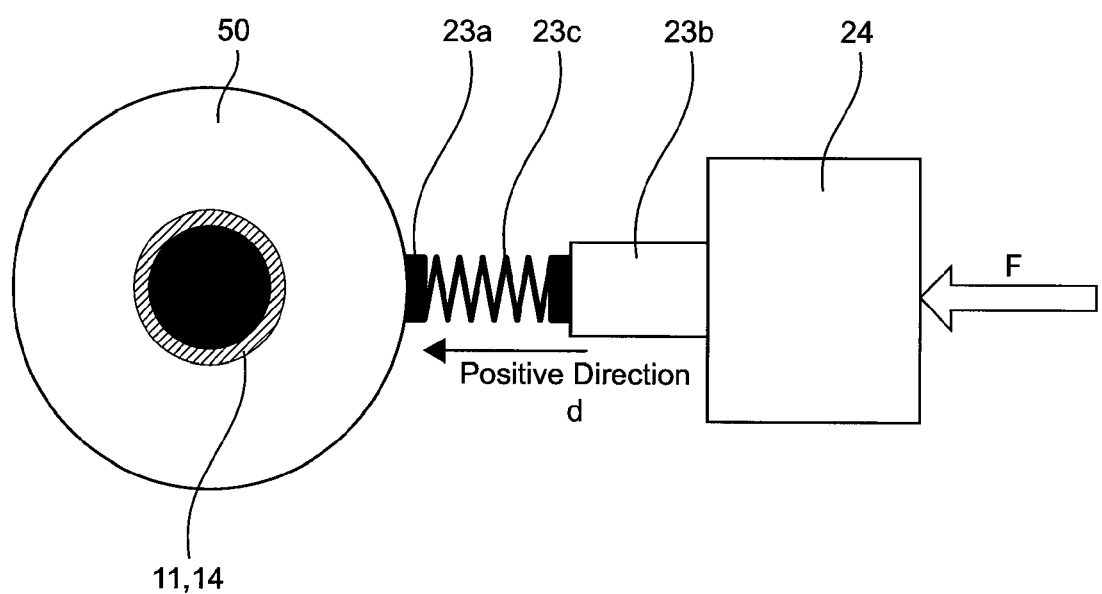
FIG. 5 shows a model of the test system of FIG. 4.

FIG. 4 shows a test system 60 for the disk centring mechanism 20 and FIG. 5 shows a mechanical model of the test system 60 used to investigate the properties and preferred settings for a typical setup. As well as the piezo actuator assembly 21, the test scenario includes a deck 10, spindle assembly 11 and disk 50 and controller 15. However, the other components of the spinstand 1 are not present described in relation to FIG. 1 are not present in this test scenario. In particular, in the test system 60, laser displacement devices (not shown for clarity) are used to accurately measure the disk displacement rather than reading servo information with a head 100. Also, in the test system 60, a linear actuator 22 for moving the piezo actuator assembly 21 is not used, and the piezo actuator assembly 21 is fixed directly to the deck 10.

In the test system 60 the disk 50 is a glass disk with 65.00 mm diameter, a central hole of 20.00 mm, a thickness of 0.65 mm, a young's modulus of 90 GPa, a Poisson ratio of 0.23 and a specific gravity of 2.47.

Figure 6:
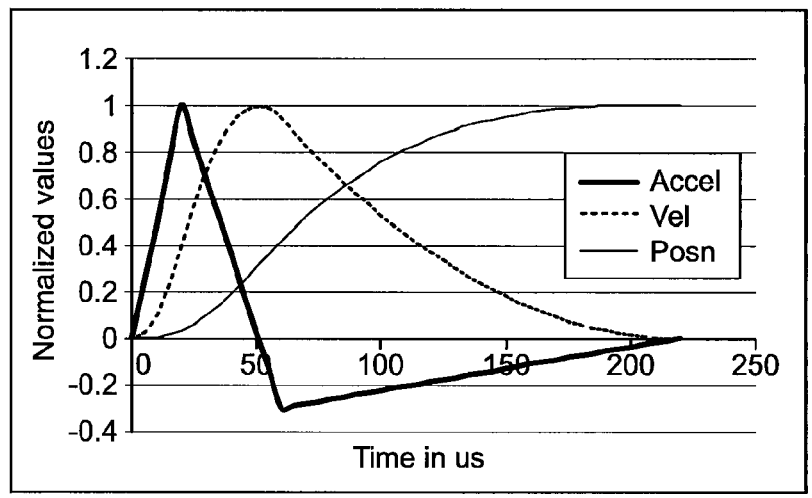
FIG. 6 shows an example of a piezo element profile suitable for use with the present invention.

The piezo actuator 23 is a E841 Piezo displacement actuator made by Physik Instrumente. This is a piezo ceramic actuator having a maximum acceleration of 200 m/s/s and a maximum displacement of 4.8 um. The pulse profile of this actuator is shown by FIG. 6. After being pulsed, the actuator 23 returns to its neutral position with negligible acceleration and velocity. The compliance of the piezo actuator 23 can be a spring constant of between 30 and 70 N/um.

The spindle adaptor 14 clamps both sides of the disk 50 in the appropriate clamping area of the disk. The friction-to-disk is uniform across the contact surface, giving a total force of 10 N opposing motion.

This test setup allowed various parameters to be varied to access their impact on the movement of the disk 50. Examples of parameters that can be varied include the amplitude of the pulse or pulses applied to piezo actuator, the number of pulses applied, the time period between pulses, the affect of varying the clamping force on the disk and the affect of varying the mass backing the piezo actuator.

In the final system the disk adapter will be mounted on an air bearing spindle which has specified maximum loads which should not be exceeded. This experiment will be used to determine a safe working limit for the impulse with regard to the air bearing spindle specifications. The total mass of the adapter and spindle centre are relatively large so the expectation is that it will not be difficult to work within the safe working limit.

Figure 10:
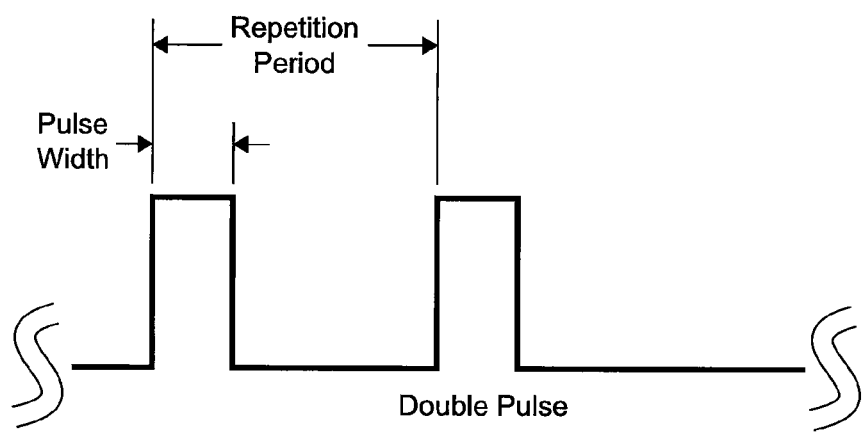
FIGS. 10 and 11 show preferred pulse shapes for driving the piezo.
Figure 11:
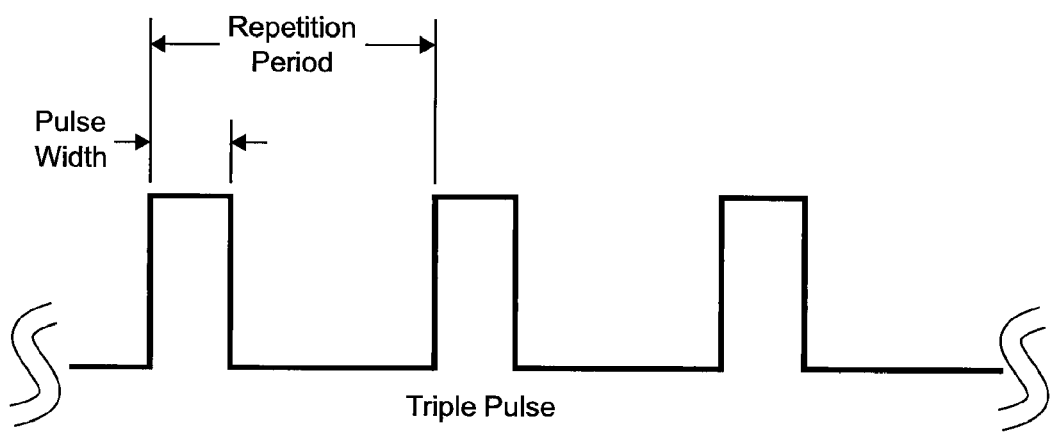

Experiments showed that there was a resonance effect in the system. In other words, at certain frequencies of pulses a much greater acceleration of the disk 50 can be achieved for a given drive voltage. It is preferable to use a low voltage to activate the piezo actuator 23 at least because of safety considerations. It is therefore preferred to make use of resonance amplification to achieve a high acceleration of the disk 50 for a given voltage. It was found that a train of double pulses (shown in FIG. 10) or triple pulses (shown in FIG. 11) were found to be effective in making controlled disk motion. A continuous stream of tuned pulses could be used but were found to offer no significant advantage either in amplification effect or precision.

Theoretical Model of System

The model shown in FIG. 5 was used to analyse the test system of FIG. 4.

In order to give a good margin and prevent the disk from slipping in the machine under expected operation the disk clamp frictional force will be of the order of 10 N. The test system has a mass of 100 g behind the Piezo actuator.

Figure 7:
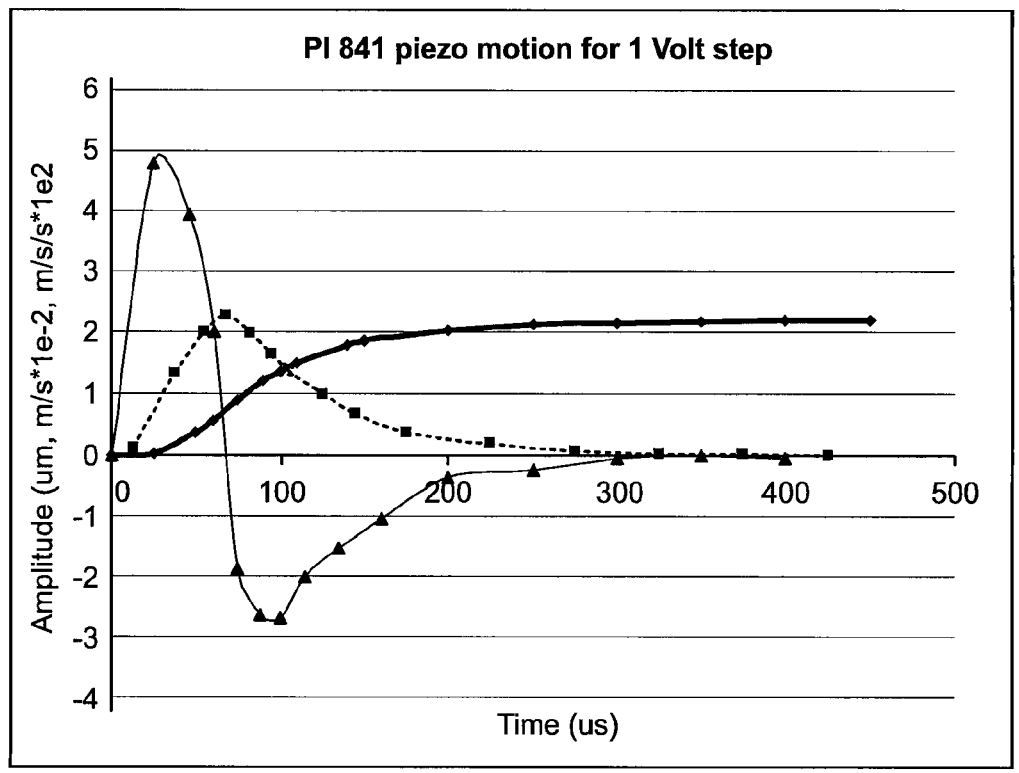
FIG. 7 shows the piezo motion for a 1 Volt step.

As shown by FIG. 7, the impulse behaviour of the piezo actuator 23 to a slew limited step input in voltage has been observed to be a triangular acceleration with an almost constant pulse width (68 us) and peak amplitude varying in proportion to the drive voltage step change around 500 ms$^{-2}$ per volt. The step input was slew limited because very fast rise times have been observed to cause ringing in the system which reduced the clarity of the edges during timing measurements. A rise time of 40 us was chosen as a compromise between high acceleration and elimination of the ringing effect.

Figure 8:
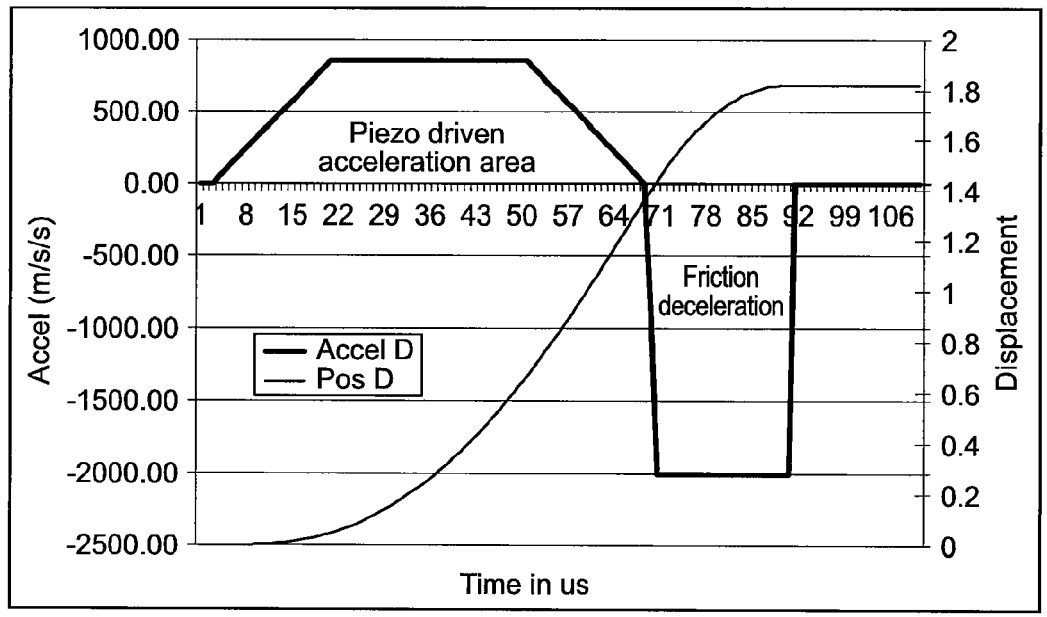
FIG. 8 shows a typical motion profile for a disk.
Figure 9:
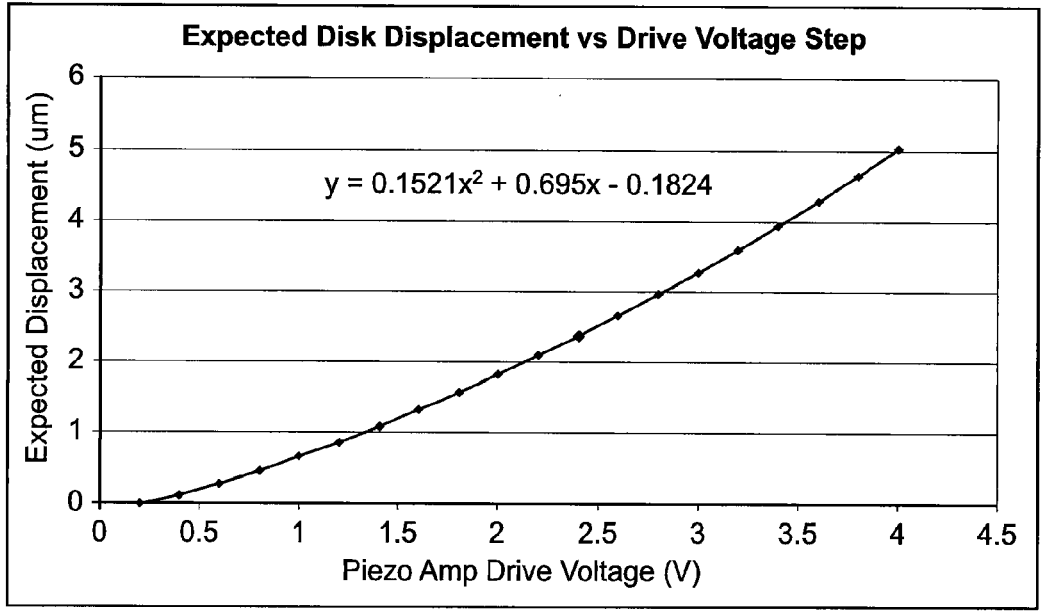
FIG. 9 shows the expected displacement versus amplifier drive voltage.

To make estimates manageable the assumed acceleration was simplified to a trapezoid which reaches peak at 20 us and starts to fall at 50 us and crosses zero at 70 us. It was further assumed that the disk 50 starts to slip once the force exceeds the clamping friction and decelerates once the force drops below the clamping friction. With the current 100 g mass of the assembly this creates an offset in the acceleration of 100 ms$^{-2}$ before the piezo actuator 23 overcomes friction. With additional assumptions that the disk mass is 5 g and the piezo actuator 23 peak acceleration is 500 ms$^{-2}$ per volt the following curves were obtained. FIG. 8 shows a typical motion profile for the disk. FIG. 9 shows the expected displacement as a function of a slew limited drive voltage step of different voltages. These curves can be used to provide an initial estimate of the drive voltage required for the piezo actuator 23 to displace the disk 50 by a given amount in the spinstand 1.

Embodiments of the present invention have been described with particular reference to the example illustrated. However, it will be appreciated that variations and modifications may be made to the examples described within the scope of the present invention.

The invention claimed is:

1. A method of centring a disk on a spindle, the method comprising:
   a) attaching the disk to the spindle with a stick-slip clamp;
   b) determining a vector by which the centre of the disk is displaced from a spindle axis;
   c) aligning the determined vector with a movably mounted piezo actuator; and
   d) applying a voltage to the piezo actuator to cause the piezo actuator to apply an impulse to the edge of the disk to cause the disk to slip in the clamp and reduce a displacement of the disk.

2. A method according to claim 1, wherein the piezo actuator comprises a body portion with an associated mass and an end portion adjacent the disk for applying said impulse to the edge of the disk, the end portion being movable relative to the body portion upon application of a voltage to the piezo actuator, where said associated mass is substantially greater than the mass of the disk.

3. A method according to claim 1, wherein the voltage is applied in a series of pulses.

4. A method according to claim 1, wherein the piezo actuator is brought into resting contact with the disk before an impulse is applied to the disk.

5. A method according to claim 1, wherein the piezo actuator is brought into compliant contact with the disk before an impulse is applied to the disk.

6. A method according to claim 1, comprising:
in step d, calculating the voltage to apply to the piezo actuator in accordance with the size of said vector and with a predetermined estimate of the displacement per voltage.

7. A method according to claim 6, comprising:
e) after step d, determining a new vector by which the centre of the disk is displaced from the spindle axis;
f) calculating the displacement of the disk caused by the previous impulse;
g) updating said estimate of the displacement per voltage; and,
h) repeating steps c and d with the new vector and the updated estimate.

8. A method according to claim 1, wherein the vector is calculated by reading a servo track written to the disk and determining the repeatable run out of the servo track.

9. A method of testing with a spinstand, comprising:
centring a disk on a spindle in accordance with the method of claim 1;
spinning up the disk; and,
reading test data to and from the disk with a read/write head.

10. Apparatus for centring a disk on a spindle, the apparatus comprising:
a controller;
a spindle having a stick-slip clamp for holding a disk and rotating the disk;
a sensor for sensing the position of the disk; and
a movably mounted piezo actuator,
wherein the controller is arranged to:
a) determine a vector by which the centre of the disk is displaced from a spindle axis from the position data from the sensor;
b) move the disk relative to the piezo actuator so that the determined vector is aligned with the piezo actuator; and c) apply a voltage to the piezo actuator to cause the piezo actuator to apply an impulse to the edge of the disk to cause the disk to slip in the clamp and reduce a displacement of the disk.

11. Apparatus according to claim 10, wherein the piezo actuator comprises a body portion with an associated mass and an end portion adjacent the disk for applying said impulse to the edge of the disk, the end portion being movable relative to the body portion upon application of a voltage to the piezo actuator, where said associated mass is substantially greater than the mass of the disk.

12. Apparatus according to claim 10, wherein the controller is arranged to apply the voltage to the piezo actuator in a series of pulses.

13. Apparatus according to claim 10, wherein the piezo actuator is arranged such that is can be brought into resting contact with the disk before an impulse is applied to the disk.

14. Apparatus according to claim 10, wherein the piezo actuator is arranged such that is can be brought into compliant contact with the disk before an impulse is applied to the disk.

15. Apparatus according to claim 10, wherein the controller is arranged to calculate the voltage to apply to the piezo actuator in accordance with the size of said vector and with a predetermined estimate of the displacement per voltage.

16. Apparatus according to claim 15, wherein the controller is arranged to:
d) after the disk has been moved by the piezo actuator, determine a new vector by which the centre of the disk is displaced from the spindle axis;
e) calculate the displacement of the disk caused by the previous movement;
f) update said estimate of the displacement per voltage; and,
h) repeating steps b and d with the new vector and the updated estimate.

17. Apparatus according to claim 10, wherein the controller is arranged to calculate the vector by reading a servo track written to the disk with a read/write head and determining the repeatable run out of the servo track.

18. A spinstand comprising:
a spindle; and,
apparatus for centring a disk on the spindle according to claim 10.

* * * * *